United States Patent [19]

Carter

[11] Patent Number: 5,527,122
[45] Date of Patent: Jun. 18, 1996

[54] PROTECTIVE COVER FOR KEYBOARDS OR CONTROL PANELS

[76] Inventor: Gesina C. Carter, 6404 81st St., Cabin John, Md. 20818

[21] Appl. No.: 874,036

[22] Filed: Apr. 27, 1992

[51] Int. Cl.⁶ ................................................. B41J 29/12
[52] U.S. Cl. ......................................... 400/496; 400/713
[58] Field of Search .................................... 400/496, 467, 400/714, 713, 676, 677; 312/7.2, 284; 248/918

[56] References Cited

U.S. PATENT DOCUMENTS

| | | | |
|---|---|---|---|
| 1,218,282 | 3/1917 | Kurowski | 400/676 |
| 3,920,979 | 11/1975 | Kilby et al. | 400/486 |
| 4,456,315 | 6/1984 | Markley et al. | 312/7.2 |
| 4,546,947 | 10/1985 | Gesten | 400/691 |
| 4,768,021 | 8/1988 | Ferraro | 70/63 |
| 4,786,120 | 11/1988 | Sparks et al. | 312/208.3 |
| 4,834,330 | 5/1989 | Swillinger | 400/713 |

FOREIGN PATENT DOCUMENTS

| | | | |
|---|---|---|---|
| 0063490 | 4/1983 | Japan | 400/713 |
| 0022976 | 1/1986 | Japan | 400/713 |
| 2143117 | 2/1985 | United Kingdom | 400/691 |

OTHER PUBLICATIONS

Prince et al. "Data Terminal Keyboard and Dust Cover", Oct. 1981 Technical Digest, No. 64, p. 45.

*Primary Examiner*—Edgar S. Burr
*Assistant Examiner*—Anthony H. Nguyen
*Attorney, Agent, or Firm*—Glenna Hendricks

[57] ABSTRACT

This invention is a protective cover for a keyboard or other control panel with attachment means, using different options as preferred for specific equipment. The cover can be separately obtained and secured to the housing or chassis of various equipment. The purpose of the cover is to allow owners of equipment with control panels and keyboards, including touch pads, to separately purchase a protective cover that can be secured to the equipment. The cover is for protection against inadvertent key or button depression, settling of dust, spattering of liquid, and other adverse effects.

The invention consists of (1) a lid, also referred to as a plate in this disclosure, and (2) a frame that is attachable to the housing of keyboards by adhesive regions on the bottom of the frame or other means as described in this patent. Adhesive regions can consist of peel-off adhesive, suction cups, stick-on VELCRO regions, snaps, and the like. Other means include spring-loaded clamps that fit snugly onto the chassis. The plate can be permanently hinged to the frame of the cover or it can be removable at the hinge by snapping it in and out of the frame, or can be otherwise detaching.

9 Claims, 6 Drawing Sheets

PROTECTIVE COVER FOR KEYBOARDS OR CONTROL PANELS

FIELD OF THE INVENTION

This invention relates to protective covers for keyboards or control panels of cable TV control boxes, television sets, calculators, typewriters, fax machines, touch-tone telephones, electronic touch-pad control panels, or other equipment.

SUMMARY OF THE INVENTION

This invention is a protective cover for a keyboard or other control panel with attachment means, using different options as preferred for specific equipment. The cover can be separately obtained and secured to the housing or chassis o of various equipment. The purpose of the cover is to allow owners of equipment with control panels and keyboards, including touch pads, to separately purchase a protective cover that can be secured to the equipment. The cover is for protection against inadvertent key or button depression, settling of dust, spattering of liquid, and other adverse effects.

The invention consists of (1) a lid, also referred to as a plate in this disclosure, and (2) a frame that is attachable to the housing of keyboards by adhesive regions on the bottom of the frame or other means as described in this patent. Adhesive regions can consist of peel-off adhesive, suction cups, stick-on VELCRO regions, snaps, and the like. Other means include spring-loaded clamps that fit snugly onto the chassis. The plate can be permanently hinged to the frame of the cover or it can be removable at the hinge by snapping it in and out of the frame, or can be otherwise detaching. Magnets should only be used for non-electronic equipment. The frame need only be as high as the buttons it protects plus the thickness of the plate. The protective cover can be designed to fit the surfaces of any variety of keyboard or control panel. For curved keyboards, the frame could consist of a back strip only or two separately-mountable frame sections that support the hinges for the cover, and the cover could be equipped with pads or feet so that the cover clears the keys.

The cover of this disclosure differs from covers that are placed loosely over the entire keyboard, or that are a permanent part of the housing, or that are designed to lock against theft or tampering, or that cover the housing but not the keys. It is a cover that can be secured to the equipment in the desired place. For most applications, it would serve as protection against mechanical button or touch-pad depression, as happens when a pet sits on a cable TV control panel, or something drops on a keyboard, or a pocket calculator is squeezed in the pocket or bag. These covers could also serve as keyboard covers to protect against liquid damage such as occurs as a result of spilled drinks or in water sports, e.g., boating.

BACKGROUND OF THE INVENTION

This invention presents a low-cost, convenient means to protect keyboards of various electronic or conventional equipment from inadvertent key depression, or other nuisances. Such protective covers could help extend the functional lifetime of such equipment. The following is a description of related U.S. patent documents and the differences in their purposes or functionalities from the present invention.

U.S. Pat. No. 2,543,146 (1951) to Charles N. Bace, "Television Cabinet With Sliding Removable Chassis," describes a complete television cabinet with complete removable chassis for a television set. It is not a simple attachable cover for the control buttons only. It applies to television sets only.

U.S. Pat. No. 2,719,292 (1955) to Malcolm P. Junkin, "Panel Cap," describes a rigid cap to cover a permanent protrusion that extends beyond the surface of a housing or chassis. It is attached permanently in four corners of the cap to the chassis and cannot be opened for subsequent access to the protrusion.

U.S. Pat. No. 3,096,409 (1963) to Harvey Hubbel and Joseph F. Healy, "Plate Locking Cover Attachment," describes a locking cover to protect primarily electric wall switches of the toggle type that need to remain in a specific position. It is made to be "tamper proof" against deliberate resetting of switches. It is not a protective cover against inadvertent key depression of keyboards or modern electronic control panels. It cannot be readily opened or removed for convenient access.

U.S. Pat. No. 3,480,728 (1969) to Joseph H Chandler, "Protective Shield For Telescriber Machines," describes a protective shield to be placed over control knobs at the left-hand side of telescriber machines so that they can be used by left-handed persons. This is a U-shaped shield that covers only a part of the platen area so that the central area remains accessible for the pen. It is not an easily removable, full keyboard protective cover for the functional purpose described in this disclosure.

U.S. Pat. No. 3,971,240 (1976) to John A. Love, Sr., "Locking Cover For Television Controls," is aimed at protection against deliberate attempts to change the setting of a control panel on a vertical face of a television set. The special feature is that it can be locked in place and can be unlocked only by the person with the key. The patent emphasizes throughout the text that the purpose is the locking arrangement for television controls. It is neither a removable, readily openable cover, nor is it for broad applicability to electronic panels or other keyboards.

U.S. Pat. No. 4,060,163 (1977) to James S Willingham, "Keyboard Guard," describes a raised the level of the housing surrounding the keys of a keyboard to the level of the keys, leaving the keys open for depressing. Hence, it does not cover the keys themselves and offers no protection to the keyboard or control panel.

U.S. Pat. No. 4,449,763 (1984) to Loren A. Barnett, "Protective Cover For Keyboard Machines," describes a permanently-affixed, high keyboard cover that comes with the chassis by initial design. It is not a separately obtainable, attachable cover. It also leaves a large opening remaining for an operator's two hands to reach through, to be able to operate the keyboard with the cover in its permanent place. Hence, the amount of protection is limited and, in particular, is of no value against several of the problems addressed in this invention.

U.S. Pat. No. 4,532,162 (1985) to Thomas B. Neece, "Car Radio And Stereo Protection," describes a cover to be permanently placed over the front of a car radio or tape deck, with the actual control buttons accessible through the cover. The function is to hide the appliances from ordinary view from the outside of vehicles against theft. It is not a protective cover against inadvertent button depression.

U.S. Pat. No. 4,893,954 (1990) to Donald R. Kotur, "Removable Keyboard Cover For Office Machines," describes is a cover that is placed loosely over the keyboard that is supposed to stay in place by shallow indents in the lower surface that match the imprint of the keyboard configuration. The material could be flexible as, for example, leather. The cover is not held in place by a frame that can be mounted by peel-off adhesion, suction cups, or any other mode of firm attachment. Hence, pressure on top of this cover could still depress the keys, an inadvertent hand or elbow bump on the cover could still easily dislodge it, or dust and moisture could still easily reach the keyboard.

The following are examples of problems not addressed in the prior art references:

1. When a cat sits on the control panel of a cable TV channel selector and thereby causes the selector to flip through the channels or causes the TV to be turned on or off;
2. When a pet walks on a computer or typewriter keyboard that is left on, thereby depressing keys, or when its shedding hair settles between the keys and the chassis;
3. When a pet with a single press of the paw automatically redials a long distance number when the phone is off the hook;
4. When in a hand wave or inadvertent elbow motion, a key becomes depressed;
5. When coffee or other liquid spills on a keyboard; or
6. When a pocket calculator is exposed to pocket lint or is exposed to moisture through the pocket, e.g., when in the rain or on a boat.

DEFINITIONS

Figure 1A:
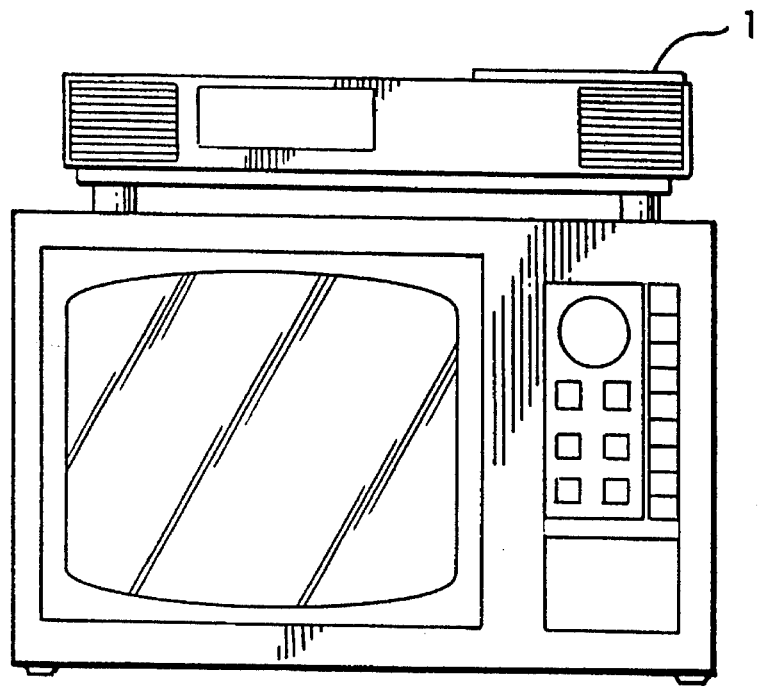
FIG. 1 is a cover design appropriate for a cable TV channel selector placed on top of a TV set, showing the placement on the equipment, a side view, and a top-down view of the lid, or plate, covering the control buttons.

In this disclosure, the following definitions and terminology apply:

1. Chassis or Housing. Used synonymously. The part of the to-be-protected equipment in which the keyboard or control panel is mounted by the manufacturer.
2. Keyboard or Control Panel. Used synonymously. The part of the to-be-protected equipment that presents the keys or buttons that, when depressed, send signals to the equipment to execute instructions (e.g., on/off controls, input/output instruction keys and the like).
3. Cover. The invention described in this patent that consists of a) a frame that can be secured onto a chassis or housing surrounding the keyboard or control panel, and b) a plate or lid that is attached to the frame by one or more hinges.
4. Frame. The part of the invention in which the plate or lid is mounted and which is the part that is to be secured to the housing of the equipment with an adhesive region. (Plates that are secured with suction cups or clamps do not require a frame).
5. Hinge. The part of the invention that connects the plate to the frame such that the plate can be rotated with respect to the frame to an "open" or "closed" position.
6. Adhesive Region. The surface of the frame that is designed to attach firmly to the housing by way of adhesive (including simple peel-off stick-on), suction cup, magnet, stick-on VELCRO, clamping mechanism, or other means.
7. Plate. The part of the cover that extends over the keys to protect them against inadvertent depression or undesirable substances, and is either completely removable or can be opened or closed by rotation with respect to its frame. This part is sometimes referred to as the lid, especially in instances when the plate has curvature.

DETAILED DESCRIPTION OF THE INVENTION

The objective of this invention is to provide users of keyboards or control panels with a separately-obtainable cover that can be fastened to the housing firmly enough that the motion of a pet or a small child or other moderate mechanical force would not cause the cover to become dislodged from the equipment. The cover is not simply placed loosely over the keyboard, resting on the table top, as is currently available, nor is the cover necessarily attached so firmly that it could not be removed or opened up. This invention is also distinct from keyboard or switch covers that are an integral part of the equipment's housing design, or are permanently screwed or riveted onto the housing.

It is the principal objective of this invention to provide a simple, inexpensive means for keyboard or control panel owners to add a separately-obtainable cover to allow the owner to attach it onto the equipment to protect it from unforeseen nuisances caused by unwanted key depression and to protect the equipment from degradation caused by liquids, dirt, lint, or other undesirable substances.

It is lastly the objective of this invention to provide such a cover for users of keyboards of a wide range of equipment, such as cable TV control units, computer keyboards, calculators, typewriters, telephones, fax machines, and other equipment that uses keyboards or control panels.

This disclosure describes various different options as examples of the plate and frame that make up the cover, for various types of keyboards and control panels and illustrates various ways of securing the cover's frame and hinge section to the housing in which the keyboard resides.

Figure 1B:
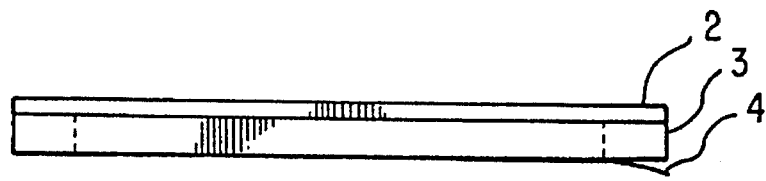
Figure 1C:
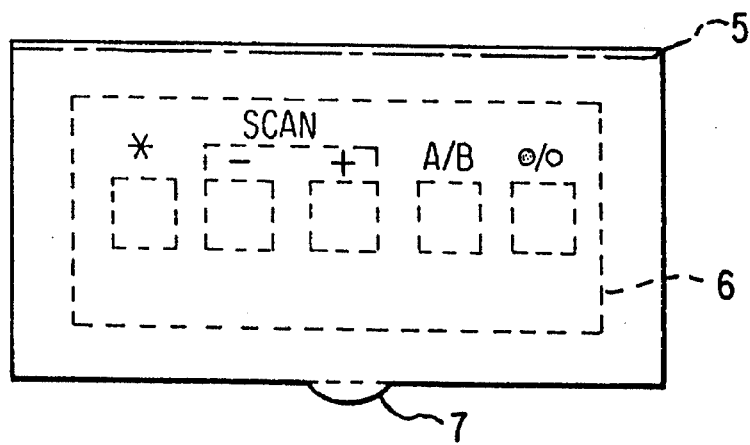

Referring to the drawings,

FIG. 1 is an application of the invention to a control panel of a cable TV control apparatus situated on top of a television set. FIG. 1a shows the location, 1, of the protective cover in the full setting of the apparatus, at the right top corner of the set, where it is most commonly placed today. FIG. 1b shows a side view. The top layer, 2, is the plate that can be opened. The middle part, 3, is the frame to which the plate is attached with a hinge, and the bottom layer, 4, is a peel-off strip that covers an adhesive surface of the frame. FIG. 1c presents a top-down view of the protective cover in situ over the control panel. The hinge, shown as a dot-dashed line, 5, can consist of a simple pin that is common to the plate and the frame, alternately channeled through the frame and the plate (see also FIG. 2b). The dashed lines, 6 in FIG. 1c, are the inside edges of the frame and the cable TV control keys that are being protected by the cover. The bottom surface of the frame described by the outer rectangle and the dashed lines, 6, on the inside form the adhesive region of the frame. An optional overhanging lip, shown as 7, is for easy opening of the cover.

Figure 2:
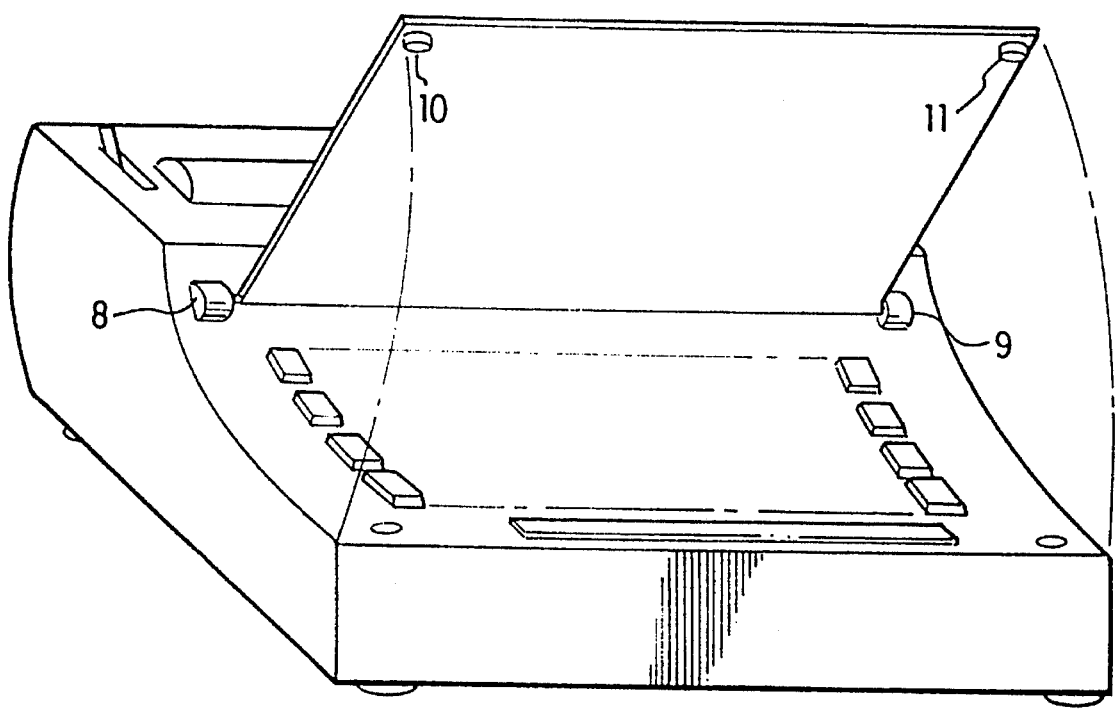
FIG. 2 is a cover that is appropriate for a full-width keyboard such as a personal computer keyboard or a typewriter keyboard. It shows the example of a frame in two sections as opposed to a frame that outlines the full dimensions of the plate. This example also shows a plate with pads or feet at the front end allowing for various heights of the keys. This is an option for a curved or irregularly-shaped chassis. The plate could have convex or concave curvature.
Figure 3:
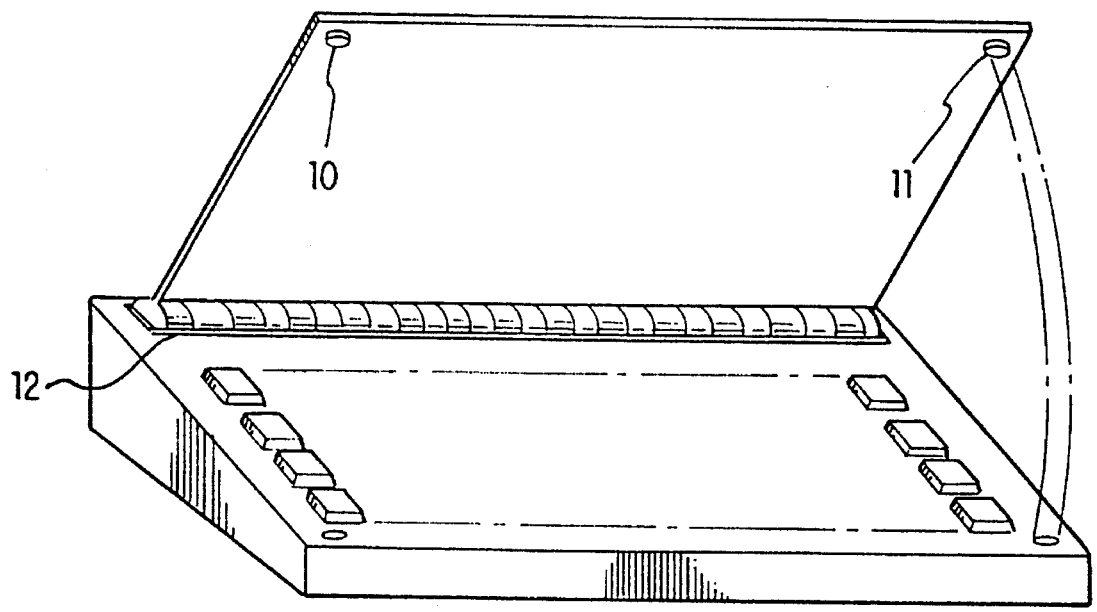
FIG. 3 is an example of the cover of FIG. 2 wherein the frame is a single hinged section.

FIGS. 2 and 3 show a full-width keyboard for a typewriter and a personal computer keyboard, respectively. FIG. 2 displays two separately-mountable frame parts, 8 and 9, one for each hinge. Again, the frame parts can be fastened by an adhesive peel-off stick-on surface. Variations in detail of fastening, hinge design, and plate detail are described below (see also FIG. 6). This particular design allows for an irregularly-shaped chassis or housing. The lid or plate could have convex or concave curvature. Pads 10 and 11, which allow the lid to clear the keys when in closed position, could be furnished separately in the packaging with a choice of heights, to be assembled by the customer for the specific application. FIG. 3 shows an integrated single strip, 12, to secure along the full width at the back of the housing. This figure shows a hinge with a pin alternately passing through the plate and the frame.

Figure 4A:
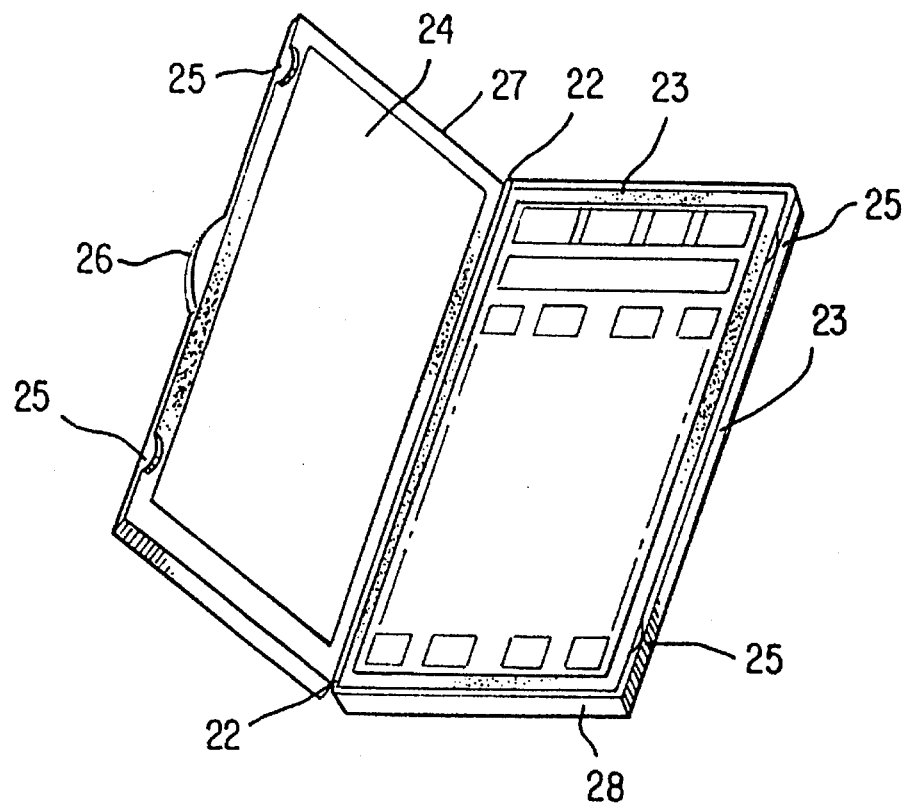
FIG. 4 is appropriate for pocket calculators. It shows a perspective view of a mounted cover and a side view with the plate open to show a gasket or a packing material to add a degree of protection against liquids and other substances.
Figure 4B:
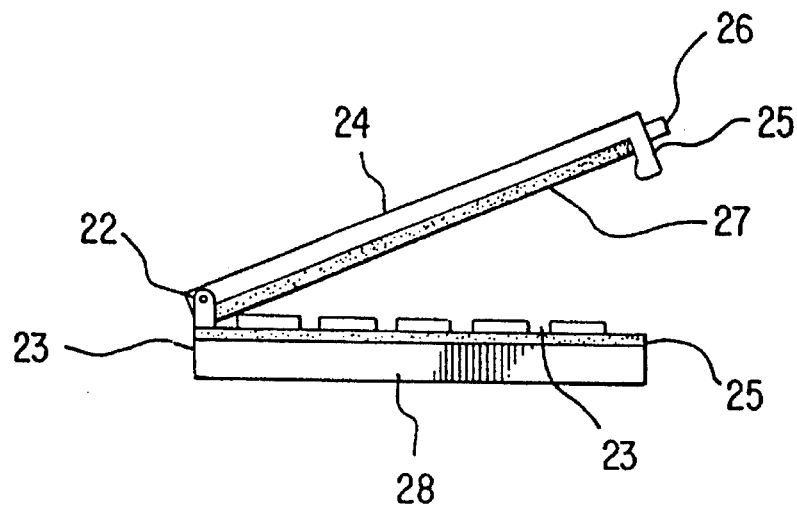

FIG. 4 shows a cover for a pocket calculator with hinge, 22, on the left. The hinge could be on the top edge, or on the right side of the keyboard for left-handed users. Here the frame, 23, is a complete rectangle around the keyboard and the dimensions of the plate, 24, are the same as the outside dimensions of the frame, except for the added lips, schematically shown as 25, for snapping closed, and 26, for easy opening. For added protection against pocket lint or moisture, a gasket or layer of compressible foam or packing material, 27, could be placed on the frame or the periphery of the plate (shown in the figure). The calculator's housing is shown as 28.

FIG. 5 shows examples of variations for the method of securing the cover's frame and hinge. The examples are not comprehensive, but merely illustrative of possible ways the details could be designed.

Figure 5A:
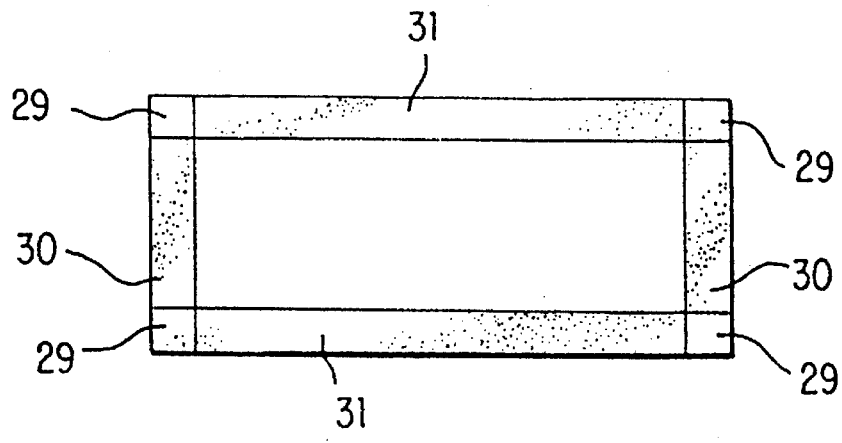
FIG. 5 shows some alternative configurations for the adhesive regions or fastening mechanisms: a) peel-off stick-on adhesive regions; b) peel-off stick-on adhesive region, back edge only; c) suction cups; d) VELCRO with the chassis patches secured by peel-off stick-on regions.

FIG. 5a shows variations in adhesive areas for complete rectangle frames: corners, 29, only; sides, 30, only; front and back, 31, only; all surfaces (all shaded areas).

Figure 5B:
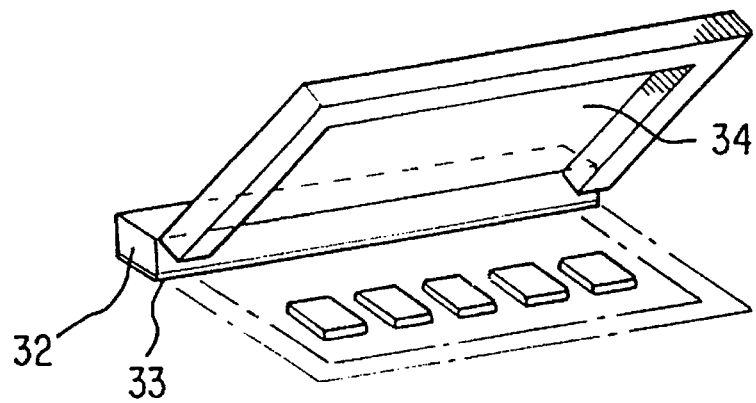

FIG. 5b shows an example in which the back section alone, 32, is the frame with adhesive, 33, and the remainder of the protective cover, 34, is all plate. The hinge in this example is further described in FIG. 6c.

Figure 5C:
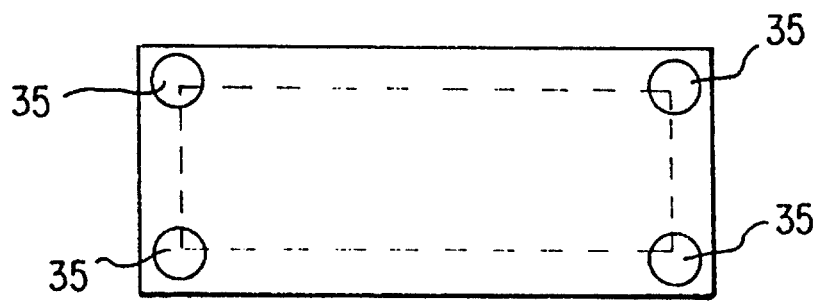

FIG. 5c shows suction cups, 35, so the entire cover can be removed, leaving nothing remaining on the housing. No frame is needed for covers using suction cups for adhesion. However, most housings of this type of equipment are finished with wrinkle paint or other textured finish that prevents a vacuum of a suction cup to hold.

Figure 5D:
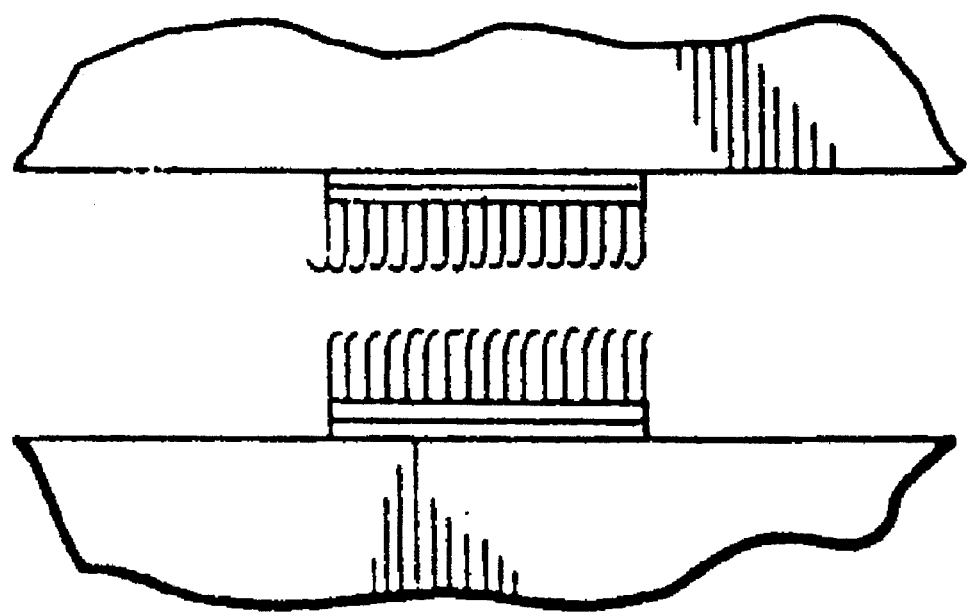

FIG. 5d is a close-up of adhesion by VELCRO: the bottom half, 36, consists of patches that are secured by peel-off adhesive region, 37, to the housing, 38. The top half, 39, of the VELCRO closure is secured to the plate, 40. This approach could be applied to plates that are placed on and removed from keyboards on top surfaces. Alternates to VELCRO could be light snaps that could be similarly mounted. Magnets are not recommended near electronic equipment and are furthermore not useful for nonmagnetic housings, so they have limited application for these covers.

Figure 6A:
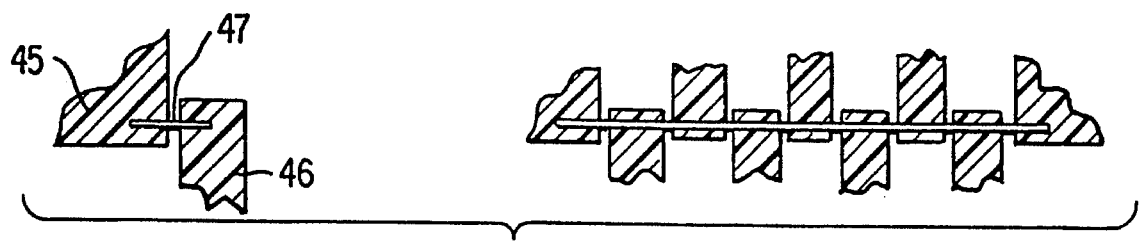
FIG. 6 gives details of three alternate hinge configurations.
Figure 6B:
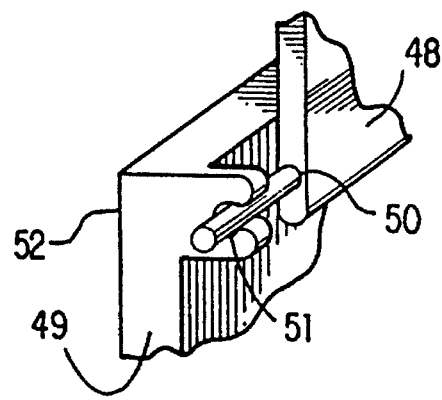
Figure 6C:
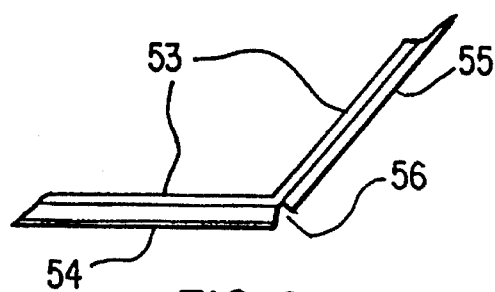

FIG. 6 gives details for three types of hinges for use in protective keyboard covers. Other common hinge arrangements can also be used. The examples here are: a) a pin hinge in which the plate, 45, is connected to the frame, 46, by a pin, 47, around which the plate can be pivoted. The pin can be secured permanently to either the frame or the plate, or both, and a hinge can use multi plate/frame sections as shown on the right; b) a snap-in hinge in which the plate, 48, is connected to the frame, 49, by a pin, 50, that is a part of the plate and can be snapped into the groove, 51, of the frame (adhesive region, 52, is also shown); and c) a continuous connection, 53, achieved by a flexible low-fatigue material such as aramid or carbon/graphite fiber that extends over both the frame, 54, and plate, 55, as shown in the figure. The plate itself is separated at the hinge line, 56, from the frame to allow for pivoting of the plate. The flexible fiber serves as hinge.

These illustrations are intended to show some lightweight, simple approaches to securing the covers to the housing or chassis of the keyboards or control panels to be protected. This disclosure describes separately obtainable covers that can be secured to existing equipment, using a variety of ways to secure them. These illustrations are intended to show examples and are not an exhaustive set of options. Any variations in the construction of these frames, plates or lids, and hinges, with similar effects or results, are a part of this disclosure and are intended to be protected by any patent issuing hereon.

I claim:

1. A protective cover for a keyboard or control panel comprising a plate, said plate having a flat bottom surface without recesses to accept keys or control means, a frame which essentially circumscribes said keyboard or control panel, and attachment means to attach said frame to a chassis surface which fully supports said cover, said protective plate being mounted to said frame for movement between closed and open positions, said frame serving as the sole support for said protective plate in its closed position and holding said protective plate, when in its closed position, spaced above said keyboard or control panel.

2. A cover of claim 1 wherein the attachment means is VELCRO.

3. A cover of claim 1 wherein the attachment means is a snap means.

4. A cover of claim 1 wherein the attachment means is magnetic.

5. A cover of claim 1 wherein the attachment means is suction cups.

6. A cover of claim 1 wherein the attachment means is a hinge pin on the cover which interacts with a snap hinge receptor attached to the chassis.

7. A cover of claim 1 wherein the attachment means is an adhesive strip.

8. A cover of claim 1 wherein the hinge means is a pin hinge.

9. A cover of claim 1 wherein the hinge means is a flexible, low-fatigue fabric.

\* \* \* \* \*